(12) United States Patent
Radke et al.

(10) Patent No.: US 6,694,684 B2
(45) Date of Patent: Feb. 24, 2004

(54) PASS THROUGH FIRESTOP DEVICE

(75) Inventors: DuWayne C. Radke, Woodbury, MN (US); Paul J. Cobian, Woodbury, MN (US); Anthony J. Schommer, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/122,859

(22) Filed: Apr. 15, 2002

(65) Prior Publication Data

US 2003/0192269 A1 Oct. 16, 2003

(51) Int. Cl.[7] .............................. E04C 2/52; E04C 2/00; E04B 1/00; F16L 37/00

(52) U.S. Cl. ...................... 52/232; 52/98; 52/220.8; 285/4

(58) Field of Search ..................... 52/220.1, 220.5, 52/220.8, 232, 98, 99, 100; 285/4

(56) References Cited

U.S. PATENT DOCUMENTS

| | | | | |
|---|---|---|---|---|
| 1,185,846 | A | * | 6/1916 | Simpson ................ 220/3.7 |
| 2,449,265 | A | * | 9/1948 | Williams ................ 138/118 |
| 3,083,736 | A | | 4/1963 | Roberts |
| 3,265,349 | A | | 8/1966 | Hamrick |
| 3,761,601 | A | | 9/1973 | Kaesser et al. |
| 3,908,208 | A | * | 9/1975 | McIlroy ................ 4/679 |
| 3,948,545 | A | * | 4/1976 | Bonds ................ 285/4 |
| 4,022,399 | A | | 5/1977 | Zajac |
| 4,086,736 | A | | 5/1978 | Landrigan |
| 4,100,933 | A | | 7/1978 | Davey et al. |
| 4,237,667 | A | | 12/1980 | Pallucci et al. |
| 4,424,867 | A | | 1/1984 | Mallow |
| 4,458,034 | A | * | 7/1984 | Fracalossi et al. ......... 521/107 |
| 4,488,388 | A | | 12/1984 | Schmidt |
| 4,623,170 | A | * | 11/1986 | Cornwall ................ 285/4 |
| 4,669,759 | A | * | 6/1987 | Harbeke ................ 285/136.1 |
| 4,724,858 | A | | 2/1988 | Cornwall |
| 4,748,787 | A | | 6/1988 | Harbeke |
| 4,800,926 | A | | 1/1989 | Beck |
| 4,832,375 | A | | 5/1989 | Emberson |
| 4,848,043 | A | | 7/1989 | Harbeke |
| 4,850,385 | A | | 7/1989 | Harbeke |
| 4,877,216 | A | | 10/1989 | Harbeke |
| 4,888,925 | A | | 12/1989 | Harbeke |
| 4,916,800 | A | | 4/1990 | Harbeke |
| 4,918,761 | A | | 4/1990 | Harbeke |
| 4,951,442 | A | | 8/1990 | Harbeke, Jr. |
| 4,953,235 | A | | 9/1990 | Cornwall |
| 5,058,341 | A | | 10/1991 | Harbeke, Jr. |
| 5,103,609 | A | | 4/1992 | Thoreson et al. |

(List continued on next page.)

FOREIGN PATENT DOCUMENTS

AU      732683      4/2001

OTHER PUBLICATIONS

U.S. patent application Ser. No. 09/904,124, filed Jul. 12, 2001, Pass–Through Firestop Device.

Primary Examiner—Carl D. Friedman
Assistant Examiner—Kevin McDermott
(74) Attorney, Agent, or Firm—David B. Patchett

(57) ABSTRACT

A cast-in-place pass through firestop device for providing a passage in a partition through which wires, cables, pipes, and the like are run includes a housing having a riser portion with frangible connections that define removable bands that can be readily removed by a user to adjust the height of the device in accordance with the thickness of the partition into which the device is installed. The removable bands include pull tabs that provide grasping means to facilitate removal of the bands by a user along a frangible connection. The housing also includes a base portion including a recess with ribs for maintaining firestop material in spaced relation from the base portion sidewall. A flame retardant char forming material, which works in combination with the firestop material to provide a fire, smoke, and water barrier, may also be provided adjacent the firestop material.

5 Claims, 4 Drawing Sheets

U.S. PATENT DOCUMENTS

| | | | |
|---|---|---|---|
| 5,105,592 A | | 4/1992 | MacMillan et al. |
| 5,155,957 A | * | 10/1992 | Robertson et al. ............ 52/232 |
| 5,263,746 A | | 11/1993 | Cornwall |
| 5,309,688 A | | 5/1994 | Robertson |
| 5,347,767 A | | 9/1994 | Roth |
| 5,390,465 A | * | 2/1995 | Rajecki .................... 52/741.3 |
| 5,452,551 A | * | 9/1995 | Charland et al. ............ 52/232 |
| 5,456,050 A | | 10/1995 | Ward |
| 5,498,466 A | | 3/1996 | Navarro et al. |
| 5,552,185 A | * | 9/1996 | De Keyser ................. 427/358 |
| 5,588,267 A | | 12/1996 | Rodriguez et al. |
| 5,653,078 A | | 8/1997 | Kies et al. |
| 5,887,396 A | | 3/1999 | Thoreson |
| 5,947,159 A | | 9/1999 | Takahashi |
| 5,953,872 A | | 9/1999 | MacMillian et al. |
| 5,954,345 A | | 9/1999 | Svoboda et al. |
| 5,970,670 A | | 10/1999 | Hoffman |
| 6,088,972 A | * | 7/2000 | Johanneck ................... 52/100 |
| 6,161,564 A | | 12/2000 | Cornwall |
| 6,161,873 A | | 12/2000 | Münzenberger et al. |
| 6,176,052 B1 | | 1/2001 | Takahashi |
| 6,230,446 B1 | | 5/2001 | Chalich |
| 6,250,835 B1 | | 6/2001 | Chamel |
| 6,314,692 B1 | | 11/2001 | Munzenberger et al. |
| 6,336,297 B1 | | 1/2002 | Cornwall |
| 6,341,741 B1 | | 1/2002 | Kotzur et al. |
| 6,357,188 B1 | | 3/2002 | Lee et al. |
| 6,405,502 B1 | | 6/2002 | Cornwall |
| 6,425,418 B1 | | 7/2002 | Maeda et al. |
| 6,426,463 B2 | | 7/2002 | Munzenberger et al. |
| 6,484,451 B1 | * | 11/2002 | Gavin .......................... 52/20 |

* cited by examiner

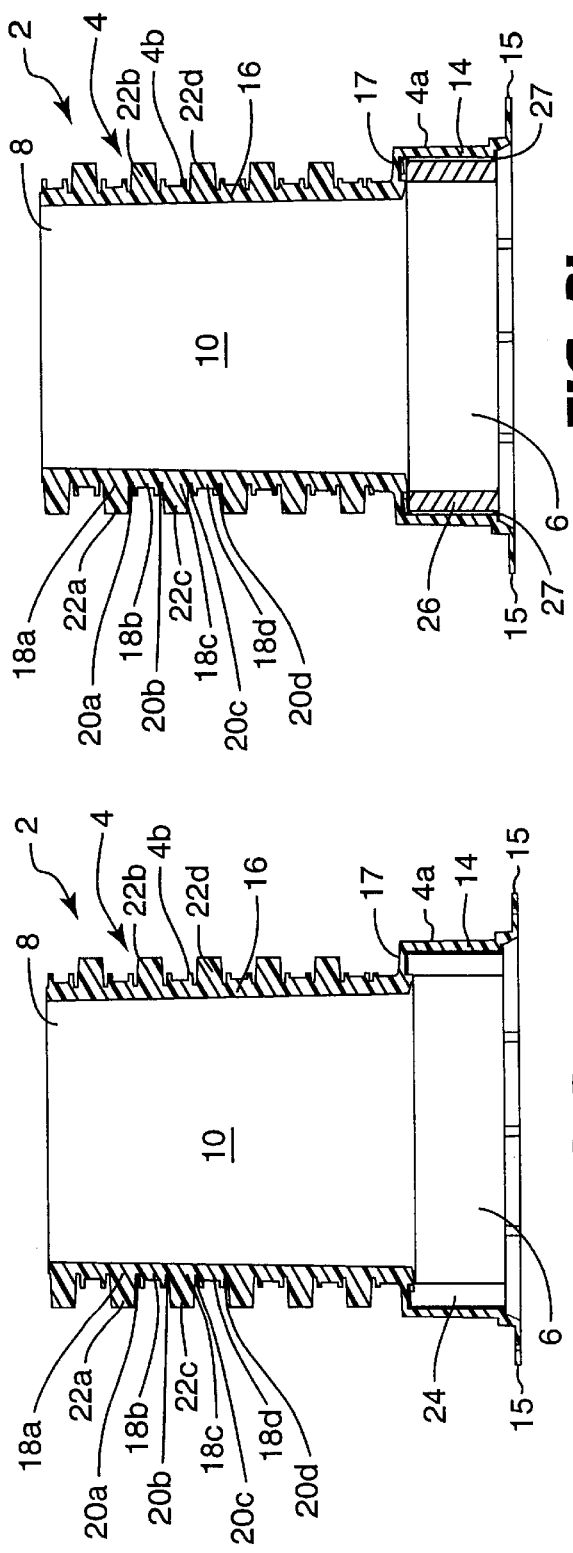
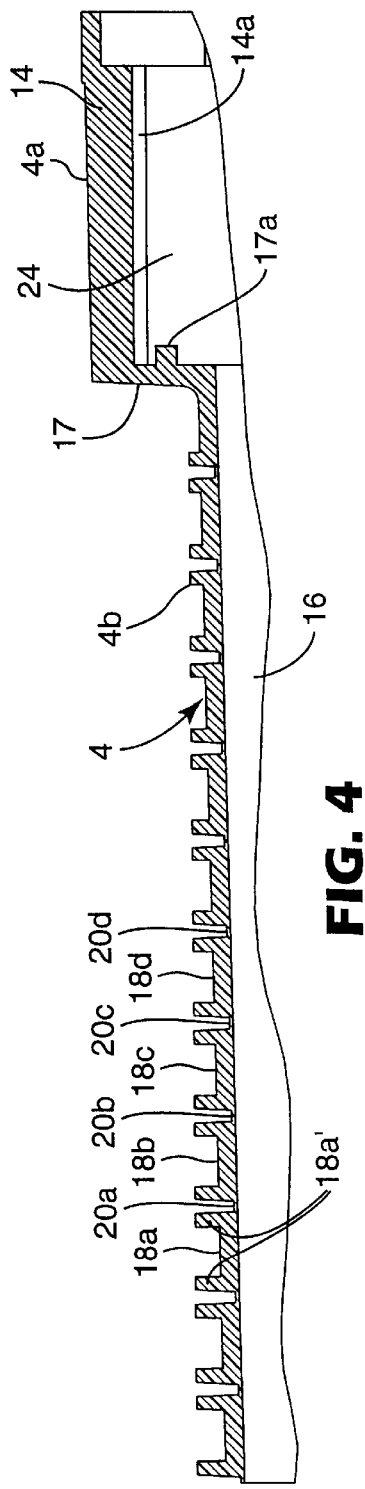

PASS THROUGH FIRESTOP DEVICE

FIELD OF THE INVENTION

The present invention relates generally to firestop devices and, more particularly, to a cast-in-place firestop device for passing cables, pipes, and the like through a concrete partition, such as a floor.

BACKGROUND OF THE INVENTION

During the construction of buildings, it is necessary to provide openings or passages through the building floors, walls, and ceilings to permit the running of wires, cables, pipes, and the like. Such openings, however, which are often referred to as through-penetrations, provide one mechanism by which fire and smoke may spread from one compartment of the building to another.

Through-penetrations in poured concrete partitions may be formed by various techniques including knocking holes in the partition after it has been formed, or using a device which is arranged on a concrete form before the concrete is poured. Such devices may include an intumescent firestop material which expands and closes the opening in the partition in the event of a fire, thereby preventing the spread of fire and smoke from one compartment of the building to another. Such devices are often referred to as cast-in-place pass through firestop devices.

Cast-in-place firestop devices for providing a through-penetration in a partition that use intumescent material to close the passageway and prevent the spread of fire and smoke in the event of a fire are known in the patented art. The Harbeke U.S. Pat. No. 4,669,759, for example, discloses a firestop stack coupling including intumescent material which expands to close off a pipe passing through the coupling in the event of a fire. The Harbeke U.S. Pat. No. 4,888,925 discloses a fire retardant fluid coupling assembly having a metallic band wrapped about an intumescent collar.

The Roth U.S. Pat. No. 5,347,767 discloses a smoke and fire protection device for providing a heat sealable raceway for running wires and cables through a concrete wall, ceiling, or floor. The device includes a thermally expansive material which, in the event of a fire, expands causing the raceway to collapse, thus preventing fire and/or smoke from passing through the wall, ceiling, or floor. The raceway slidably fits within a tubular housing allowing the raceway to extend through the sleeve to either side of the device, thereby allowing an installer to couple additional sections of the raceway at a convenient location remote from the device. The sleeve has a length sized to accommodate the thickness of the particular mounting location. Since the sleeve is sized to accommodate a particular partition thickness, the user must pre-select the appropriate size sleeve for a particular job, thereby requiring installers to keep a large number of different size devices on hand.

The Rejecki U.S. Pat. No. 5,390,465 discloses a pass through firestop device for installation in a building wall or floor to provide a pass through opening for pipes, tubing, and the like. The device includes an axially open first end and a tubular body having a second end closed by a transverse wall. A ring of intumescent material fills the axially open first end. The device is installed during the formation of the building partitions by attaching the device to form elements and then pouring the floor or wall structure. After the floor is poured, the upper end section of the tubular body is removed by cutting it flush with the upper surface of the floor.

The Münzenberger et al. U.S. Pat. No. 6,161,873 discloses a masonry lead-in fixture having a housing including an axially extending through bore, a radially protruding attachment flange provided at least at one end of the housing, an intumescent material which, in case of fire, closes the bore, and a disc-shaped partition located in the housing which extends over the inner diameter of the bore which is broken when pipe, cable, or the like is pushed through the fixture. The fixture includes a lengthening pipe formed of a plastic material that is cut-off to a desired length.

Thus, there remains a need in the industry for a cast-in-place pass through device for providing a heat sealable passageway through partitions such as floors, walls, or ceilings in a structure such as a building for running cables, wires, pipes, and the like, that can be quickly and easily installed in partitions having varying thicknesses. In addition, there remains a need for such a device that allows for early, fast, uniform, and complete expansion of the intumescent material in case of a fire.

It would therefore be desirable to provide a cast-in-place pass through firestop device for providing a heat sealable passageway in a partition that can be used in partitions of various thicknesses, and which further allows the intumescent material to quickly and completely expand when exposed to temperatures typically encountered during a fire.

SUMMARY OF THE INVENTION

The present invention provides a firestop device for providing a passage through a partition in a structure comprising a housing and firestop material arranged within the housing, wherein the housing includes at least one frangible connection transecting the housing. The term firestop material refers generally to intumescent, endothermic, and ablative materials useful in resisting the spread of fire and smoke from one compartment of a structure to another.

The frangible connection can be formed in the housing by providing a line of weakness in the housing by, for example, scoring, notching, or creasing the housing, or by molding or machining the housing to have a thin region in the wall, thereby allowing a user to easily tear the housing along the line of weakness. The frangible connection defines a removable band that can be readily removed by a user, typically with the aid of a hand tool such as pliers, to shorten the length of the housing to accommodate the thickness of the partition into which the device is installed. The removable band preferably includes a pull tab that provides grasping means for a user to remove the band from the housing along the frangible connection, thereby facilitating manual removal of the band.

In a specific embodiment, the housing includes a base portion and a riser portion, the base portion including a recess adapted to receive the firestop material, and the riser portion including the frangible connection. The base portion includes a sidewall portion and a shoulder portion that combine to define the recess. The sidewall portion extends from a first open end toward the riser portion, and the shoulder portion extends inwardly from the sidewall portion to the riser portion.

In one aspect of the invention, the sidewall and the shoulder portions include inner surfaces having ribs. The sidewall ribs serve to maintain the firestop material in the recess in spaced relation to the sidewall, thereby creating a gap between the firestop material and the sidewall that allows heated air from a fire to more completely surround the firestop material, thereby providing earlier, more uniform, and more complete expansion of the firestop material.

In one embodiment, a gasket is provided between the firestop material and the shoulder portion to provide a seal that prevents water and smoke from passing through the opening prior to expansion of the firestop material. The shoulder portion rib helps retain the gasket in place.

In another aspect of the invention, the housing has first and second opposed open ends and a hollow chamber having a longitudinal axis extending from the first open end to the second open end. The first open end is provided in the base portion and the second open end is provided in the riser portion. The firestop material is provided along the sidewall portion inner surface from the first open end to the shoulder portion.

In a more specific aspect of the invention, the housing has a two-tiered cylindrical shape with the base portion having a larger diameter than the riser portion. The base portion may also include a radially outwardly extending flange extending outwardly from the periphery of the base portion adjacent the first open end for fixing the device to a form. In one embodiment, the flange extends outwardly 360 degrees around the base portion, and in another embodiment, two separate flanges extending radially outwardly from opposite sides of the base portion are provided to allow for closer stacking of adjacent devices.

The riser portion preferably includes a plurality of equally sized transverse bands each including a manually engageable pull tab to facilitate manual removal of the associated bands with or without the aid of a manually operated hand tool. By removing successive bands, a user can adjust the length of the device (i.e. shorten) in accordance with the thickness of the partition into which the device is installed. It will be recognized that providing more bands will increase the range of partition thicknesses that can be accommodated by the device, and increasing the number of bands per unit length will increase the ability of the device to more closely match the thickness of the partition. In addition, the pull tabs on each band may be provided with indicia indicating the length of the device at the band and corresponding to the thickness of the partition. Each band may also include one or more radially outwardly extending circumferential ribs that provide the bands and, consequently, the riser with added hoop strength, and also provide a projection for making snap connections.

In another aspect of the invention, the device includes a cap that is attached to the riser portion of the device to cover the second open end. In one embodiment, the cap includes cantilevers that snap onto the circumferential ribs, thereby securely attaching the cap to the riser portion. The firestop device may also include an extension member adapted to connect with the riser portion to increase the length of the device and allow the device to be used with partitions having thicknesses greater than the standard length of the device. The outer diameter of the extension is preferably sized so that standard size plastic pipe can fit over and connect with the extension to provide additional extension for the device.

In another aspect of the invention, the device includes a retaining ring arranged within the base portion first open end adjacent the firestop material that serves to retain the firestop material in the base portion. The retaining ring may be coded with color or other indicia to indicate the quantity of firestop material provided in the device which, in turn, corresponds with the application of the device. An adapter may also be provided that connects with the base portion to allow the device to be coupled to a contoured surface such as a fluted or corrugated deck.

In a specific embodiment, the present invention provides a firestop device for providing a passage through a partition in a structure comprising a housing having first and second opposed open ends and a hollow chamber having a longitudinal axis extending from the first open end to the second open end, the housing including a cylindrical base portion having a diameter and a cylindrical riser portion having a diameter smaller than the base diameter, the base portion including an annular sidewall portion extending from the first open end toward the riser portion and a shoulder portion extending radially inwardly from the sidewall portion to the riser portion, the sidewall portion and the shoulder portion defining an annular recess for receiving firestop material, the sidewall and the shoulder portions including inner surfaces having inwardly extending ribs, the riser portion including a plurality of longitudinally arranged frangibly connected circumferential bands having equal axial lengths, each band including a radially outwardly extending pull tab that can be used to remove an associated band from the riser portion along a frangible connection, thereby to reduce the height of the device in accordance with the thickness of the partition into which the device is installed.

In another aspect of the invention, which is particularly useful for when a metal pipe is passed through the device, a flame retardant char forming material is provided within the housing adjacent the firestop material, preferably adjacent the inner surface of the firestop material. In a specific embodiment, the flame retardant char forming material is an annular band arranged concentrically within the firestop material. The flame retardant char forming material serves to strengthen the expanded intumescent material such that the resulting mass forms a fire barrier that can pass the hose stream portion of ASTM E 814 Fire Test Standard.

BRIEF DESCRIPTION OF THE DRAWINGS

The present invention will be further described with reference to the accompanying drawings, in which:

FIG. 3a is a sectional view taken along line 3a—3a in FIG. 2;

FIG. 3b is a sectional view taken along line 3b—3b in FIG. 2 showing the device with firestop material arranged therein;

FIG. 4 is a detailed sectional view taken along line 4—4 of FIG. 1;

DETAILED DESCRIPTION

Figure 1:
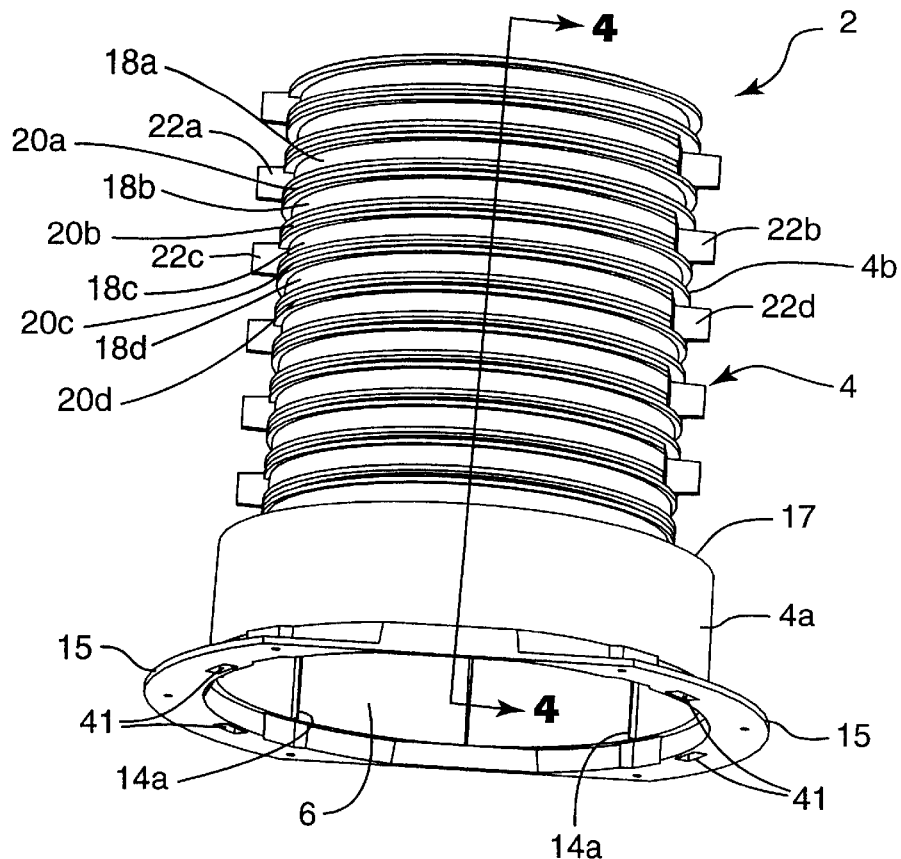
FIG. 1 is a perspective view of a firestop device according to the invention.
Figure 2:
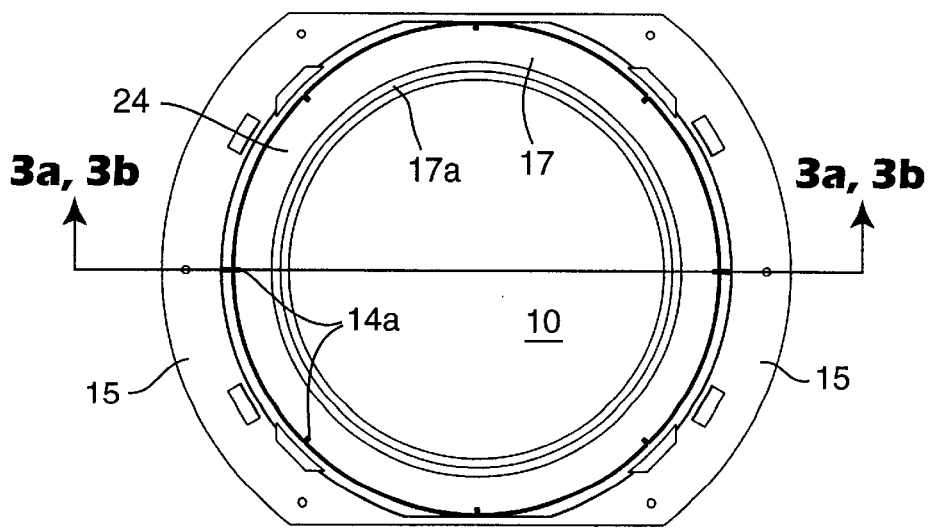
FIG. 2 is a bottom view of the housing.

Referring now to the drawings, wherein like reference numerals refer to like or corresponding parts throughout the several views, FIGS. 1–6 show a cast-in-place pass through firestop device 2 for providing a through-penetration in a floor, wall, ceiling, or the like. The term through-penetration generally refers to an opening in a floor, wall, ceiling, or the like, which allows cables, wires, pipes, or other items to pass from one compartment of a structure to another. To create a through-penetration using the device 2, the device is secured to a wooden concrete form 46 (FIG. 6) or other surface such as a fluted deck using an adapter 40 (FIG. 5), and concrete is poured into the form, thereby embedding the device 2 in the concrete 44.

The device 2 includes a generally cylindrical hollow housing 4 having an open first end 6, an open second end 8, a chamber 10 extending longitudinally from the first end 6 to the second open end 8, and intumescent firestop material 26 (FIGS. 3b, 6 and 7) arranged in the device 2 adjacent the first open end 6. It will be recognized that the housing 4 may have a shape other than cylindrical. For example, the housing 4 may have a square or rectangular cross section.

The housing 4 includes a base portion 4a having a longitudinally extending annular side wall 14 extending from the open first end 6 toward the open second end 8, radially outwardly extending flange portions 15 extending outwardly in opposite directions from the base portion 4a adjacent the open second end 8, a radially inwardly extending shoulder portion 17 extending inwardly from the sidewall 14, and a riser portion 4b having a longitudinally extending annular side wall 16 extending from the shoulder portion 17 to the second open end 8. The base portion 4a has a larger diameter than the riser portion 4b giving the housing 4 a two-tiered tapered configuration in which the base portion 4a has a greater cross-sectional area than the riser portion 4b.

In accordance with a characterizing feature of the invention, the riser portion 4b includes a plurality of circumferential bands 18a–d connected by frangible connections 20a–d. The frangible connections 20a–d allow one or more bands 18a–d of the riser 4b to be quickly, easily, accurately, and cleanly removed by a user, typically with the aid of a manually operated hand tool such as pliers, at pre-selected intervals so the device 2 can be used in partitions having a variety of thicknesses.

Each band 18 forms a continuous 360 degree loop which forms a section of the riser portion 4b that can be readily removed by a user to shorten the riser portion 4b and thereby match the thickness of the partition into which the device is installed. Each band 18 includes a pair of circumferential ribs 18a' (FIG. 4) that provide hoop strength and provide means for forming a snap connection with the riser portion 4b. The frangible connections 20a–d are lines of weakness formed by, for example, molding or machining the riser to have thin areas of material connecting adjacent bands 18a–d that can be manually broken by a user to separate adjacent bands.

Each band 18a–d includes a pull tab 22a–d extending radially outwardly from the bands 18a–d. The pull tabs 22a–d facilitate removal of the associated bands 18a–d by providing grasping means for a user to grasp and pull, typically with the aid of a hand tool such as pliers, thereby tearing the associated frangible connection to remove the band from the riser 4b. Each pull tab 22a–d may be marked with indicia indicating the length or height of the device at that pull tab corresponding to the thickness of the partition.

Figure 5:
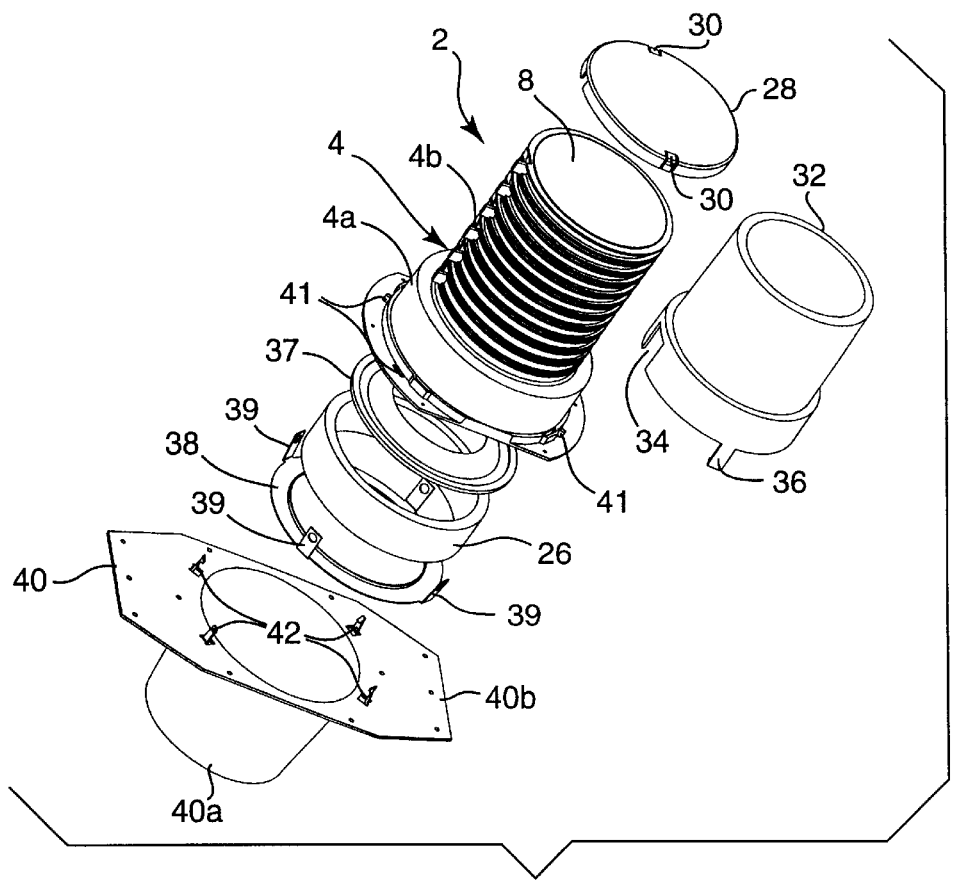
FIG. 5 is an exploded perspective view of the device showing a cap, an extension member, and an adapter.

The base portion 4a contains an annular recess 24 for receiving firestop material 26 (FIGS. 3b, 5, 6 and 7). The firestop material 26 is provided in the form of an annular ring as shown in FIG. 5 that extends along the inner surface of the sidewall portion 14 from the first open end 6 to the shoulder portion 17. The firestop material 26 may be held in place in the recess 24 with adhesive, using mechanical fasteners, or by using a retaining ring 38 (FIG. 5) described more fully below. To facilitate the installation of a pipe through the device 2, the inner surface of the firestop material 26 if preferably aligned with the inner surface of the riser portion 4b, that is, the inner diameter of the firestop material 26 and the riser 4b are the same, whereby the diameter of the chamber 10 is generally the same along the entire length of the device 2.

The recess 24 is defined by the sidewall portion 14 and the shoulder portion 17 of the base portion 4a. In accordance with another characterizing feature of the invention, the inner surfaces of the sidewall portion 14 and the shoulder portion 17 facing the chamber 10 include rib portions 14a and 17a, respectively. The sidewall ribs 14a extend radially inwardly from the sidewall 14 and extend longitudinally from adjacent the flange 15 to the shoulder portion 17. The shoulder portion rib 17a is an annular projection extending outwardly from the shoulder portion 17 in the direction of the first opening 6. The side wall portion ribs 14a maintain the firestop material 26 in spaced relation from the sidewall portion 14 and create an air gap 27 between the firestop material 26 and the side wall portion 14 which, in the event of a fire, allows the entire axial length of the firestop material to be exposed to heated air, thereby aiding rapid, complete, and uniform expansion of the firestop material which in turn closes the through-penetration.

Referring now to FIG. 5, the device 2 is provided with a cap 28 that attaches to the riser portion 4b and covers the second open end 8. The cap 28 prevents concrete being poured during the formation of a partition from entering the device 2. The cap 28 includes snap connectors 30 that allow the cap to be manually snap fit onto the riser portion 4b via the circumferential ribs 18a'.

The device 2 may also be provided with an extension member 32 that attaches to the top of the riser portion 4b adjacent the open second end 8. The extension member 32 contains cut-outs 34 aligned with tabs 22a–d on the riser portion 4b that allow the extension member 32 to be placed in overlapping relation with the riser portion 4b. The extension member 32 also includes snap connections 36 that allow the extension to be attached to the riser portion 4b. The extension member 32 serves to increase the height of the device 2 and thereby allows the device 2 to be used in partitions in which the thickness of the partition is greater than the standard height of the device 2. The extension member 32 is also preferably sized so that standard size plastic pipe can fit over the top of the extension member 32 to provide further extension. That is, the outer diameter of the extension member 32 corresponds to the inner diameter of a standard size plastic pipe, whereby the plastic pipe is adapted to fit over the extension member 32.

The device includes an annular gasket 37 arranged in the recess 24 between the firestop material 26 and the shoulder portion 17. The gasket 37 is formed of an elastomeric material and serves to form a smoke and water seal at ambient conditions with the pipe installed prior to expansion of the firestop material. The device 2 is also provided with an annular retaining ring 38 that attaches to the base portion 4a of the device and retains the firestop material 26 in the device 2. The retaining ring 38 includes tabs 39 to facilitate attachment of the retaining ring 38 to the base portion 4a. The tabs 39 are aligned with and extend through slots 41 provided in the base portion 4a. Once the retaining ring 38 is installed in the device 2, the tabs 39 are bent outwardly to secure the retaining ring 38 in place and also anchor the device 2 in the concrete after the concrete is poured.

Since the quantity of firestop material 26 provided in the device 2 will vary depending on the type of installation (for example, more firestop material will be provided in the device when it is used with a plastic pipe than a metal pipe), the retaining ring 38 may be provided with color coding to indicate the quantity of firestop material installed in the device and/or the type of pipe in the installation. This way, after the device has been installed in a partition, the quantity of firestop material and the type of installation (i.e. a plastic pipe or a metal pipe installation) can be quickly and easily identified by visual inspection, eliminating the need to remove the retaining ring to make such a determination.

In addition, the device 2 may be provided with an adapter 40 that attaches to the base portion flange 15 and allows the device 2 to be used on contoured surfaces such as a fluted deck. The adapter 40 includes a hollow tubular extension portion 40a, an outwardly extending flange portion 40b, and snap connectors 42 that snap connect with the base portion 4a of the device 2.

While the device may be formed from a variety of materials, the device 2 is preferably formed of a synthetic plastic material such as polyethylene. The firestop material 26 may include an intumescent compound, an endothermic compound, or both an intumescent compound and an endothermic compound. Exemplary intumescent compounds include intumescent graphite such as intercalated graphite and acid treated graphite, hydrated alkali metal silicates, vermiculite, perlite, and NaBSi. Exemplary endothermic compounds include aluminum trihydrate (ATH), $Al(OH)_3$ hydrated zinc borate ($ZnB_2O_4 \cdot 6H_2O$), calcium sulfate ($CaSO_4 \cdot 2H_2O$) also known as gypsum, magnesium ammonium phosphate ($MgNH_4PO_4 \cdot 6H_2O$), magnesium hydroxide ($Mg(OH)_2$), encapsulated $H_2O$, and magnesium ammonium phosphate hexahydrate, $MgO \cdot 2B_2O_3 \cdot 9H_2O$. A preferred firestop material 26 is INTERAM Ultra GS Graphite mat available from 3M Company, St. Paul, Minn.

Figure 6:
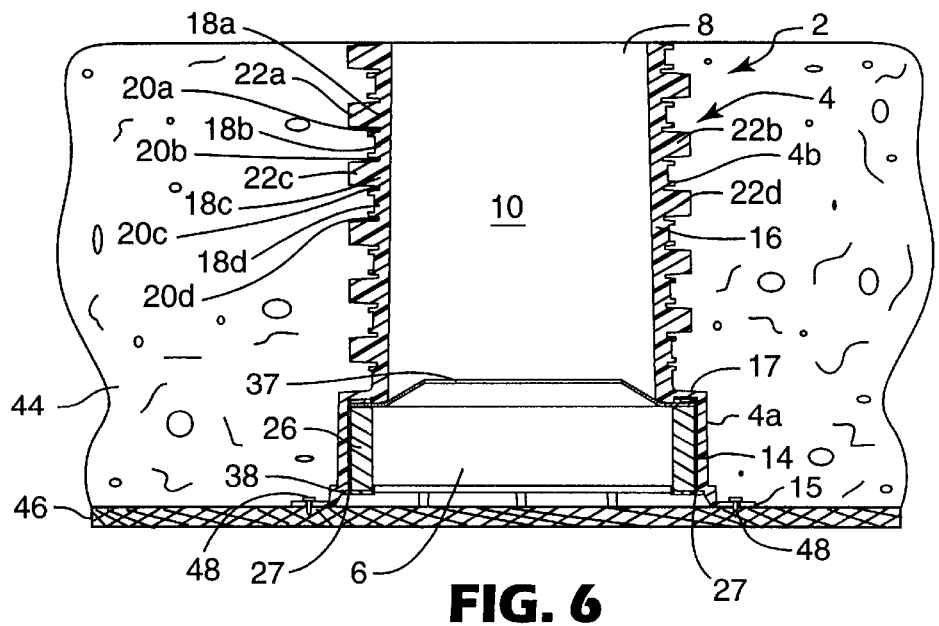
FIG. 6 is a sectional view showing the device installed in a concrete floor.

Referring to FIG. 6, the device 2 is shown installed in a concrete floor 44. The device 2 is installed by first securing the device 2 to a wooden concrete form 46 with fasteners 48, and then pouring concrete into the form 46, thereby embedding the device in the concrete. The cap 28 is then removed and any unnecessary bands 18a–d are removed by grasping and pulling the pull tabs 22a–d. It will also be recognized that if the thickness of the partition is known, excess bands can be removed prior to installation.

Figure 7:
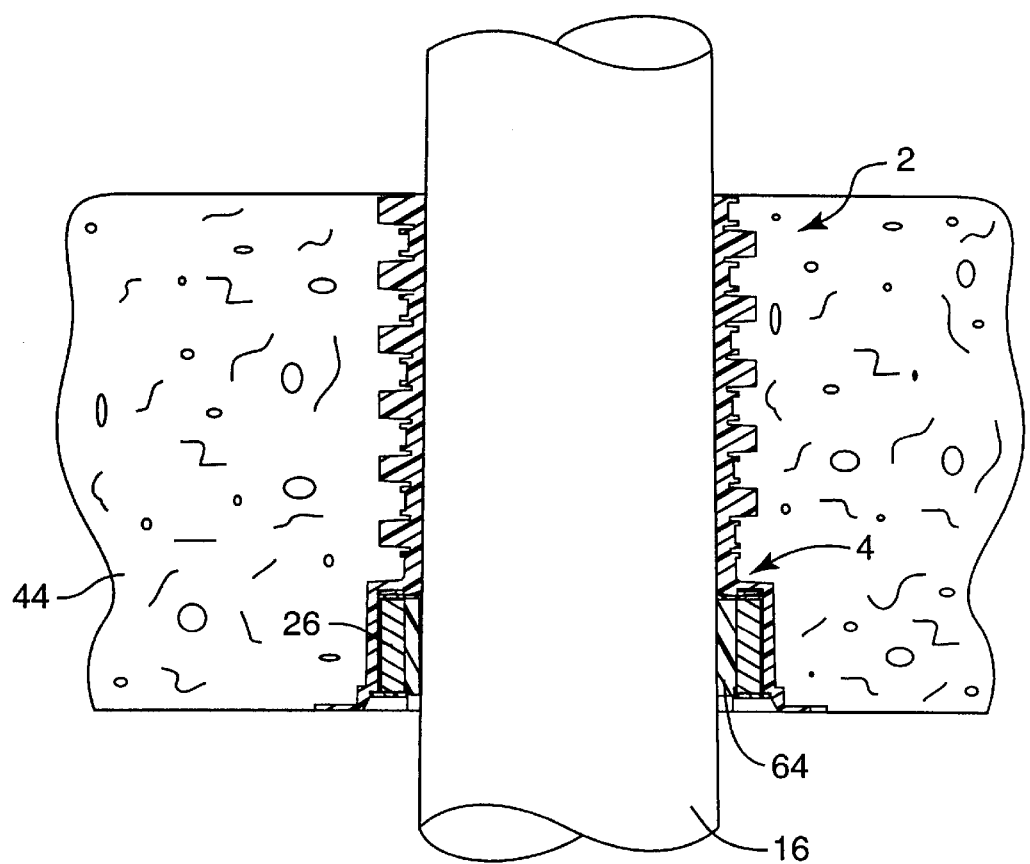
FIG. 7 is a sectional view of an alternate embodiment of the invention showing a pipe passing through the device.

Referring to FIG. 7, there is shown a cast-in-place pass through firestop device 2 installed in a concrete floor 44 with the form 46 shown in FIG. 6 removed and a metal pipe 62 passing through the device 2. The firestop device 2 in FIG. 7 is similar to the one shown in FIG. 6 except it further includes a flame retardant char forming insert 64 arranged between the intumescent firestop material 26 and the metal pipe 62. It has been found that by providing a flame retardant char forming material between the intumescent material 26 and the pipe 62, a fire barrier capable of passing the hose stream portion of the ASTM E814 test standard is created. Providing the char forming insert 64 is particularly useful when the device 2 is used to firestop a metal pipe passing through an opening in a floor.

The insert 64 can be a continuous annular band that is secured within the device 2 using adhesive, mechanical fasteners, or the retaining ring 38 described above. Alternatively, the insert 64 can be a discontinuous arcuate band that can be compressed like a spring clip so that the insert can be positioned within the intumescent material 26 and held in place by the spring force.

The insert 64 is formed of a flame retardant material (i.e. one that does not support combustion) that does not melt and which forms a char when exposed to high temperatures such as those encountered in a fire. In this manner, insert 64 works in combination with the expanded intumescent material 26 to provide a fire, smoke, and water barrier in the annular space around the metal pipe that enables the device to pass the hose stream portion of the ASTM E814 test standard.

The particular material selected for the insert 64 is not critical to the invention hereof, so long as it provides the desired function. Suitable flame retardant materials that form a char include halogenated polymers such as polychloroprene, polyvinyl chloride and polyvinylidene fluoride; chlorine flame retardant compounds such as perchloropentacyclodecane and chlorinated paraffins; bromine flame retardant compounds such as decabromodiphenyl oxide, octabromodiphenyl oxide, and tetrabromodipentaerythritol; phosphorous compounds such as ammonium polyphosphate and tributylphosphate; compounds including both chlorine and phosphorous such as 1,3dichloro-2-propanol phosphate and 2-chloroethanol phosphate; and nonhalogenated polymers such as hydrated zinc borate and boric oxide. A preferred flame retardant char forming material for the insert is polyvinyl chloride.

The patents, patent documents, and patent applications cited herein are incorporated by reference in their entirety as if each were individually incorporated by reference. It will be apparent to those of ordinary skill in the art that various changes and modifications may be made without deviating from the inventive concept set forth above. For example, it will be recognized that the device may also include stabilizers to prevent rotational or axial movement of the device after the device has been installed in a floor, ceiling, wall, or the like. Thus, the scope of the present invention should not be limited to the structures described in this application, but only by the structures described by the language of the claims and the equivalents of those structures.

What is claimed is:

1. A firestop device comprising:
   (a) a housing;
   (b) firestop material arranged within said housing; and
   (c) a flame retardant char forming material arranged within said housing adjacent said firestop material.

2. A firestop device as defined in claim 1, wherein said flame retardant char forming material is arranged within said firestop material.

3. A firestop device as defined in claim 2, wherein said flame retardant char forming material is an annular band arranged concentrically within said firestop material.

4. A firestop device as defined in claim 3, wherein said flame retardant char forming material is polyvinyl chloride.

5. A firestop device comprising:
   (a) a cylindrical housing including a base portion having an annular recess and a riser portion including a plurality of frangibly connected circumferential bands each including a pull tab that can be used to manually remove a band from said riser portion along a frangible connection;
   (b) firestop material arranged within said base portion annular recess; and
   (c) a flame retardant char forming material arranged within said base portion annular recess within said firestop material.

* * * * *